United States Patent Office 3,304,308
Patented Feb. 14, 1967

3,304,308
1-ALKYL AMINO-PHENOL, 2 ARYL-3,4 DIHYDRO-NAPHTHALENE COMPOUNDS
William Laszlo Bencze, New Providence, N.J., assignor to Ciba Corporation, New York, N.Y., a corporation of Delaware
No Drawing. Filed May 18, 1964, Ser. No. 368,380
9 Claims. (Cl. 260—294.7)

This application is a continuation-in-part of application 286,213, filed June 7, 1963 and now abandoned.

The present invention concerns 1,2-diaryl-3,4-dihydro-naphthalene compounds. More particularly, it relates to 1-(4-R-3-$R_1$-5-$R_2$-phenyl)-2-Ar-3,4-dihydro-naphthalenes, in which R is hydroxyl or etherified hydroxyl, $R_1$ is a tertiary amino-methyl group, $R_2$ is hydrogen or a tertiary aminomethyl group, and Ar is a monocyclic carbocyclic aryl group or a monocyclic heterocyclic aryl group, or salts thereof, as well as N-oxides thereof, salts of N-oxides thereof, or quaternary ammonium compounds thereof. Also included is process for the preparation of such compounds.

The compounds of the present invention are more especially those of the formula

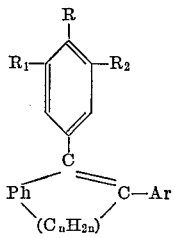

in which the groups R, $R_1$, $R_2$ and Ar have the previously-given meaning, Ph is a 1,2-phenylene radical, and the group of the formula —$(C_nH_{2n})$— is lower alkylene separating by two carbon atoms the 1,2-phenylene radical from the carbon atom substituted by the group Ar, or salts thereof, as well as N-oxides thereof, salts of N-oxides thereof, or quaternary ammonium compounds thereof.

The substituent R in the 4-position of the phenyl group is primarily hydroxyl, but may also be etherified hydroxyl. The latter is aliphatic etherified hydroxyl, such as lower alkoxy, e.g. methoxy, ethoxy, n-propyloxy, isopropyloxy, n-butyloxy and the like, or substituted aliphatic etherified hydroxyl, such as tertiary amino-lower alkoxy, in which the tertiary amino group has the meaning given below and is separated from the oxygen atom by at least two carbon atoms, such as N,N-di-lower alkyl-amino-lower alkoxy, in which N,N-di-lower alkyl-amino is separated from the oxygen atom by two to three carbon atoms, N,N-alkylene-imino-lower alkoxy, in which alkylene has from four to eight carbon atoms, and N,N-alkylene-imino is separated from the oxygen atom by two to three carbon atoms, N,N-aza-alkylene-imino-lower alkoxy, in which alkylene has from four to six carbon atoms, the aza-nitrogen, which may be substituted, for example, by lower alkyl and the like, is separated from the imino-nitrogen by two to three carbon atoms, and the N,N-aza-alkylene-imino group is separated from the oxygen atom by two to three carbon atoms, or N,N-oxa-alkylene-imino and N,N-thia-alkylene-imino, in which alkylene has preferably four carbon atoms, the oxa-oxygen and the thia-sulfur, respectively, is separated from the imino-nitrogen by at least two carbon atoms, and the N,N-oxa-alkylene-imino and N,N-thia-alkylene-imino portion, respectively, is separated from the oxygen atom by two to three carbon atoms, as well as (1,3-diaza-2-cycloalken-2-yl)-methoxy, in which the 1,3-diaza-2-cycloalken-2-yl portion has from five to six ring members, and one of the aza-nitrogen atoms may be substituted, for example, by lower alkyl and the like, such as 2-imidazolinyl-methoxy, (1-methyl-2-imidazolinyl)-methoxy, (1,4,5,6-tetrahydro-2-pyrimidyl)-methoxy and the like, or any other suitably substituted aliphatic etherified hydroxyl group.

The tertiary amino portion of the tertiary amino-methyl substituents represented in the above formula by the groups $R_1$ and $R_2$, as well as the tertiary amino portion of any tertiary amino-lower alkoxy substituent representing group R, is an N,N-di-substituted amino group, in which the substituents are aliphatic radicals, such as lower alkyl, lower alkenyl and the like, cycloaliphatic radicals, such as cycloalkyl and the like, cycloaliphatic-aliphatic radicals, such as cycloalkyl-lower alkyl and the like, carbocyclic aryl, such as monocyclic carbocyclic aryl, carbocyclic aryl-aliphatic radicals, such as monocyclic carbocyclic aryl-lower alkyl and the like, or any other suitable substituents. These radicals have from one to ten carbon atoms, and may be represented above all by lower alkyl, e.g. methyl, ethyl, n-propyl, isopropyl, n-butyl, isobutyl, secondary butyl, n-pentyl, neopentyl and the like, as well as by lower alkenyl, e.g. allyl, methallyl and the like, cycloalkyl having from three to eight, preferably from five to seven, carbon atoms, e.g. cyclopentyl, cyclohexyl and the like, cycloalkyl-lower alkyl, in which cycloalkyl has from three to eight, preferably from five to seven, carbon atoms, e.g. cyclopentylmethyl, cyclohexylmethyl, 2-cyclohexylethyl and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like. These radicals may contain further substituents; hydroxyl, lower alkoxy, e.g. methoxy, ethoxy and the like, mercapto, lower alkyl-mercapto, e.g. methylmercapto, ethylmercapto, or any other suitable functional group may be attached to such radicals. N,N-di-substituted amino groups are above all N,N-di-lower alkyl-amino, e.g. N,N-dimethylamino, N-methyl-N-ethylamino, N,N-diethylamino, N,N-di-n-propylamino, N,N-di-isopropylamino and the like, as well as N-cycloalkyl-N-lower alkyl-amino, in which cycloalkyl has from five to seven ring carbon atoms, e.g. N-cyclopentyl-N-methyl-amino, N-cyclohexyl - N - methyl-amino, N-cyclohexyl-N-ethyl-amino and the like, N-lower alkyl-N-phenyl-lower alkyl-amino, e.g. N-benzyl-N-methyl-amino, N-benzyl-N-ethyl-amino, N-methyl-N-(1-phenylethyl)-amino, N-methyl - N - (2-phenylethyl)-amino and the like, or any other analogous, N,N-di-substituted amino group, such as, for example, N-hydroxy-lower alkyl-N-lower alkyl-amino, e.g. N-(2-hydroxyethyl)-N-methyl-amino and the like, N,N-di-hydroxy-lower alkyl-amino, e.g. N,N-di-(2-hydroxyethyl)-amino and the like.

In an N,N-disubstituted amino group representing tertiary amino, the two substituents may also be taken together and, with the nitrogen atom, form a cyclic substituent. These N,N-di-substituted amino groups may be represented, for example, by 1-N,N-alkylene-imino, in which alkylene has from four to eight carbon atoms, 1-N,N-aza-alkylene-imino groups, in which alkylene has from four to six carbon atoms, and the aza-nitrogen is separated from the imino-nitrogen by at least two carbon atoms, or 1-N,N-oxa-alkylene-imino and 1-N,N-thia-alkylene-imino, in which alkylene has preferably four carbon atoms, and the oxa-oxygen and the thia-sulfur, respectively, is separated from the imino-nitrogen by at least two carbon atoms. These radicals are represented by 1-pyrrolidino, 2-methyl-1-pyrrolidino, 1-piperidino, 2-methyl-1-piperidino, 4-methyl-1-piperidino, 3-hydroxy-1-piperidino, 3-acetoxy-1-piperidino, 3-hydroxymethyl-1-piperidino, 1-N,N-(1,6-hexylene)-imino, 1-N,N-(1,7-heptylene)-imino, 4-lower alkyl-1-piperazino, e.g. 4-methyl-1-piperazino, 4-ethyl-1-piperazino and the like, as well as 1 - N,N - (3-aza-3-methyl-1,6-hexylene)-imino, 1-N,N-(4-aza-4-methyl-1,7-heptylene)-imino, 1-piperazino, 4-hydroxyethyl-1-piperazino, 4-acetoxyethyl-1-piperazino, or 4-morpholino, 4-thiamorpholino and the like.

The group Ar substituting the 2-position of the 3,4-dihydro-naphthalene ring system is monocyclic carbocyclic aryl, particularly phenyl, as well as substituted phenyl, such as (lower alkyl)-phenyl, in which lower alkyl is methyl, ethyl, n-propyl, isopropyl, n-butyl and the like, (etherified hydroxy)-phenyl, such as (lower alkoxy)-phenyl, in which lower alkoxy is methoxy, ethoxy, n-propyloxy, isopropyloxy, n-butyloxy and the like, (esterified hydroxy)-phenyl, especially (halogeno)-phenyl, in which halogeno is a hydroxyl group esterified with a hydrohalic acid and represents fluoro, chloro, bromo and the like, (nitro)-phenyl, (amino)-phenyl, (N,N-di-lower alkyl-amino)-phenyl, in which N,N-di-lower alkyl-amino is N,N-dimethylamino, N,N-diethylamino and the like, (trifluoromethyl)-phenyl or any other similarly substituted phenyl group. The group Ar may also be monocyclic heterocyclic aryl, such as pyridyl, e.g. 3-pyridyl, 4-pyridyl and the like, or any other analogous monocyclic aryl group.

The aromatic portion of the 3,4-dihydro-naphthalene nucleus, represented in the above formula by the 1,2-phenylene radical Ph, is unsubstituted or may be substituted by one or more than one of the same or of different substituents attached to any of the four positions available for substitution. Substituents are, for example, lower alkyl, e.g. methyl, ethyl, n-propyl, isopropyl and the like, etherified hydroxyl, such as lower alkoxy, e.g. methoxy, ethoxy, n-propyloxy, isopropyloxy, n-butyloxy and the like, esterified hydroxyl, such as halogeno (representing hydroxyl esterified by a hydrohalic acid), e.g. fluoro, chloro, bromo and the like, nitro, amino, N,N-di-lower alkyl-amino, e.g. N,N-dimethylamino, N,N-diethylamino and the like, trifluoromethyl, or any suitable substituent. The 1,2-phenylene group Ph in the above formula stands above all for 1,2-phenylene, (lower alkyl)-1,2-phenylene, (hydroxy)-1,2-phenylene, (etherified hydroxy)-1,2-phenylene, such as (lower alkoxy)-1,2-phenylene and the like, (esterified hydroxy)-1,2-phenylene, such as (halogeno)-1,2-phenylene and the like, (nitro)-1,2-phenylene, (amino)-1,2-phenylene, (N,N-di-lower alkyl-amino)-1,2-phenylene, (trifluoromethyl)-1,2-phenylene or any other analogous substituted 1,2-phenylene group.

The 3-position and/or the 4-position of the 3,4-dihydro-naphthalene ring system is unsubstituted or may contain lower alkyl, e.g. methyl, ethyl and the like, as substituents. The group —$(C_nH_{2n})$— in the above formula representing alkylene separating the aromatic portion of the 3,4-dihydro-naphthalene ring system from the carbon atom carrying the group Ar has preferably two carbon atoms, i.e. is 1,2-ethylene, but may also have more than two carbon atoms, and represent, for example, 1,2-propylene, 1,2-butylene, 2,3-butylene and the like.

Salts of the compounds of this invention are acid addition salts, such as pharmaceutically acceptable acid addition salts, with inorganic acids, e.g. hydrochloric, hydrobromic, sulfuric, phosphoric acids and the like, or organic acids, such as organic carboxylic acids, e.g. acetic, propionic, pivalic, glycolic, maleic, malic, tartaric, citric, salicylic, 2-acetoxy-benzoic, nicotinic, isonicotinic acid and the like, or organic sulfonic acids, e.g. methane sulfonic, ethane 1,2-disulfonic, 2-hydroxyethane sulfonic, p-toluene sulfonic, naphthalene 2-sulfonic acid and the like. Other acid addition salts may be used as intermediates, for example, in the preparation of acid addition salts or in the purification of the free compounds (according to the methods described below), or may be helpful for identification and characterization purposes. Acid addition salts for the latter are inter alia those with acidic organic nitro compounds, e.g. picric, picrolonic, flavianic acid and the like, or metal complex acid, e.g. phosphotungstic, phosphomolybdic, chloroplatinic, Reinecke acid and the like. Mono- or poly-salts may be formed.

Also included within the scope of this invention are the N-oxides of the above compounds, as well as the acid addition salts, such as the pharmaceutically acceptable acid addition salts, thereof.

Quaternary ammonium derivatives of the compounds of this invention are particularly those formed with reactive esters of alcohols and strong acids, such as those with lower alkyl halides, e.g. methyl, ethyl, n-propyl or isopropyl chloride, bromide or iodide and the like, di-lower alkyl sulfates, e.g. dimethyl sulfate, diethyl sulfate and the like, lower alkyl lower alkane sulfonates, e.g. methyl or ethyl methane or ethane sulfonate and the like, lower alkyl carbocyclic aryl sulfonates, e.g. methyl or ethyl benzene sulfonate or p-toluene sulfonate and the like. Also included as quaternary ammonium compounds are quaternary ammonium hydroxides or quaternary ammonium salts with acids other than the hydrohalic, sulfuric or organic sulfonic acids mentioned above. Mono- or poly-quaternary ammonium compounds may be formed.

The compounds of this invention have antifibrillatory properties and are, therefore, useful in the treatment of cardiac irregularities, such as neurogenic or cardiogenic, auricular or ventricular fibrillation.

Compounds of this invention also have estrogenic properties, and are, therefore, useful in lieu of other estrogenic agents, e.g. estradiol, stilbestrol, hexestrol and the like, for example, in the treatment of animals to increase weight gain, efficiency of feed utilization and the like.

Furthermore, it has also been found that compounds of this invention inhibit pregnancy and are, therefore, useful as antifertility agents.

Particularly useful are the compounds of the formula

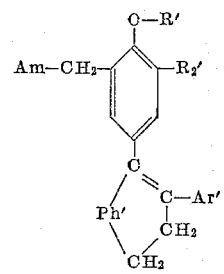

in which Ph' is 1,2-phenylene, (lower alkyl)-1,2-phenylene, (lower alkoxy)-1,2-phenylene and (halogeno)-1,2-phenylene, Ar' is phenyl, (lower alkyl)-phenyl, (lower alkoxy)-phenyl and (halogeno)-phenyl, R' is hydrogen, N,N-di-lower alkyl-amino-lower alkoxy, in which the nitrogen is separated from the oxygen by two to three carbon atoms, N,N-alkylene-imino-lower alkoxy, in which alkylene has from four to eight carbon atoms, and the nitrogen is separated from the oxygen by two to three carbon atoms, or (1,3-diaza-2-cycloalken-2-yl)-methoxy, in which the 1,3-diaza-2-cycloalken-2-yl portion has from five to six ring members, Am is N,N-di-lower alkyl-amino, or N,N-alkylene-imino, in which alkylene has from four to eight carbon atoms, and $R_2'$ is hydrogen or the group Am—$CH_2$— in which Am has the previously-given meanng, and acid addition salts, particularly pharmaceutically acceptable acid addition salts, thereof.

Another group of useful compounds are those of the formula

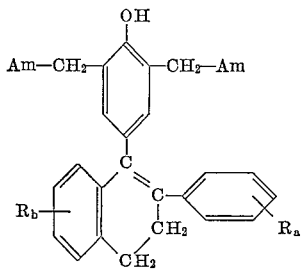

in which Am is N,N-di-lower alkyl-amino, N,N-alkylene-imino, in which alkylene has from four to six carbon atoms, 4-lower alkyl-1-piperazino or 4-morpholino, and each of the groups $R_a$ and $R_b$ is hydrogen, lower alkyl, lower alkoxy or halogeno, and acid addition salts, particularly pharmaceutically acceptable acid addition salts, thereof.

The compounds of this invention may be used in the form of compositions for enteral or parenteral application, which contain the new compounds in admixture with a pharmaceutically acceptable organic or inorganic, solid or liquid carrier. For making up the preparations there can be employed carriers, such as water, gelatine, sucrose, lactose, wheat starch, corn starch, stearic acid, magnesium stearate, calcium stearate, talc, vegetable oils, alcohol, benzyl alcohol, acetic acid, gums, acacia, tragacanth, propylene glycol, polyalkylene glycols or any other carrier useful for the manufacture of such preparations. The latter may be in solid form, for example, as capsules, tablets, dragees and the like, or in liquid form, for example, as solutions, suspensions and the like. If necessary, these preparations may contain auxiliary substances, such as preserving, stabilizing, wetting, emulsifying, coloring, flavoring agents and the like, salts for varying the osmotic pressure, buffers, etc., and may also contain, in combination, other useful substances.

The compounds of this invention are prepared according to known methods, for example, by reacting a 1–(4-hydroxy - 5-$R_2$-phenyl)-2-Ar-3,4-dihydro-naphthalene, in which $R_2$ and Ar have the previously-given meanings, with an N,N-disubstituted amine or an acid addition salt thereof in the presence of formaldehyde or a formaldehyde-furnishing reagent, and, if desired, converting in a resulting compound having a free hydroxyl group, such group into an etherified hydroxyl group, and/or, if desired, introducing a substituent into the aromatic portion of the 3,4-dihydro-naphthalene radical, and/or, if desired, converting a substituent of the aromatic portion of the 3,4-dihydro-naphthalene radical into another substituent, and/or, if desired, converting a resulting salt into the free compound or into another salt, and/or, if desired, converting a resulting compound into an N-oxide thereof or a quaternary ammonium compound thereof, and/or, if desired, converting a resulting compound or an N-oxide into a salt thereof, and/or, if desired, converting a quaternary ammonium compound into another quaterary ammonium compound.

The above reaction is carried out according to the procedure known as the Mannich reaction (as extensively described, for example, by Blicke in Organic Reactions, volume 1, page 303, Wiley 1942). The reaction of the starting material with the formaldehyde or a formaldehyde-furnishing reagent (e.g. paraformaldehyde, trioxane, diamethoxymethane, diethoxymethane and the like), and the N,N-disubstituted amine is carried out while cooling at room temperature or at an elevated temperature, and in the absence, or preferably in the presence, of a diluent. Formaldehyde itself is used in the form of an aqueous solution thereof; if necessary, a lower alkanol, e.g. ethanol and the like, may be added as a diluent. A formaldehyde-furnishing reagent, such as paraformaldehyde, is usually employed in the presence of an organic solvent, such as a lower alkanol, e.g. ethanol, isopentanol and the like, or an aqueous mixture thereof, and of a mineral acid, e.g. hydrochloric, sulfuric acid and the like. An N,N-disubstituted amine is, for example, an N,N-di-lower alkyl-amine, e.g. N,N-dimethylamine, N-ethyl-N-methyl-amine, N,N-diethylamine, N,N-di-n-propyl-amine and the like, an N,N-alkylene-imine, in which alkylene has from four to eight carbon atoms, e.g. pyrrolidine, piperidine, 2-methylpiperidine, N,N-(1,6-hexylene)-imine, N,N-(1,7-heptylene)-imine and the like, an N,N-aza-alkylene-imine, in which alkylene has from four to six carbon atoms, e.g. piperazine, 4-methyl-piperazine, N,N - (3-aza-3-methyl-1,6-hexylene)-imine, N,N-(4-aza-4-methyl-1,7-heptylene)-imine and the like, morpholine, thiamorpholine, or any other N,N-disubstituted amine capable of furnishing the desired tertiary amino group. The N,N-disubstituted amine may also be used in the form of an acid addition salt thereof, such as a salt with a mineral acid, e.g. hydrochloric, sulfuric acid and the like.

If only one tertiary aminomethyl is to be introduced into a 1-(4-hydroxy-5-$R_2$-phenyl)-2-Ar-3,4-dihydro-naphthalene, in which $R_2$ is hydrogen, the starting material and the two reagents are employed in about equimolar amount, whereby a small excess of the latter over the phenolic starting material may be employed. Two tertiary amino-methyl groups are introduced by using an excess of formaldhyde or the formaldehyde-furnishing reagent and by lengthening the reaction time.

In a resulting compound, a free hydroxyl group may be converted into an etherified hydroxyl, particularly an aliphatic etherified hydroxyl, group according to known methods, for example, by forming a salt, especially an alkali metal salt, of the resulting compound having a free hydroxyl group (for example, by treating the latter with a reagent capable of forming a metal salt, such as an alkali metal hydride, e.g. sodium hydride and the like, an alkali metal amide, e.g. sodium amide, potassium amide and the like, an alkali metal lower alkoxide, e.g. sodium or potassium methoxide, ethoxide, tertiary butoxide and the like, preferably in the presence of an appropriate diluent), and reacting the resulting salt with a reactive ester of an alcohol, especially an aliphatic alcohol, such as a lower alkyl halide, e.g. methyl, ethyl, n-propyl or isopropyl chloride, bromide or iodide, a di-lower alkyl sulfate, e.g. dimethyl sulfate and the like, a tertiary amino-lower alkyl halide, in which the tertiary amino group is separated from halogeno, e.g. chloro, bromo and the like, by at least two carbon atoms, such as N,N-di-lower alkyl-amino-lower alkyl halide, in which N,N-di-lower alkyl-amino is separated from halogeno by two to three carbon atoms, N,N-alkylene-imino-lower alkyl halide, in which alkylene has from four to eight carbon atoms, and N,N-alkylene-imino is separated from halogeno by two to three carbon atoms, N,N-aza-alkylene-imino-lower alkyl halide, in which alkylene has from four to six carbon atoms, the aza-nitrogen, which may be substituted, for example, by lower alkyl, e.g. methyl, ethyl and the like, is separated from the imino-nitrogen by two to three carbon atoms, and N,N-aza-alkylene-imino is separated from halogeno by two to three carbon atoms, or N,N-oxa-alkylene-imino-lower alkyl halide and N,N-thia-alkylene-imino-lower alkyl halide, in which alkylene has preferably four carbon atoms, the oxa-oxygen and the thia-sulfur, respectively, is separated from the imino-nitrogen by at least two carbon atoms, and N,N-oxa-alkylene-imino and N,N-thia-alkylene-imino, respectively, is separated from halogeno by two to three carbon atoms, or a (1,3-diaza-2-cycloalken-2-yl)-methyl halide, in which the 1,3-diaza-2-cycloalken-2-yl portion has from five to six ring members, or an acid addition salt of the esters having an acid addition salt-forming group. Other methods of converting a free hydroxyl group into an etherified hydroxyl group, particularly into a tertiary amino-lower alkoxy group, in which tertiary amino is separated from the oxygen atom by at least two carbon atoms, include the reaction of a compound having the free hydroxyl group with a tertiary amino-lower alkanol, in which tertiary amino is separated from the oxygen atom by at least two carbon atoms, in the presence of a di-substituted carbonate, e.g. diphenyl carbonate, diethyl carbonate and the like, at an elevated temperature, preferably at about 180° to about 200°, and, if necessary, in the presence of a transesterification reagent, e.g. an alkali metal, an alkali metal carbonate, an alkali metal alkoxide and the like, or the transformatoin of the resulting compound having a free hydroxyl group into a suitable intermediate, for example, by converting the hydroxyl group into an alkoxy-carbonyloxy or halogeno-carbonyloxy group by esterification of the compound having the free hydroxyl group, and reacting the resulting intermediate compound with a tertiary amino-lower alkanol, in which tertiary amino is separated from the oxygen by at least two carbon atoms. A suitable method of converting a hydroxyl group into an etherified hydroxyl group, particularly a tertiary amino-lower alkoxy group, also comprises converting the hydroxyl group into a reactive esterified hydroxy-lower alkoxy group, in which the reactive esterified hydroxyl group, e.g. chloro, bromo, 4-methyl-sulfonyloxy, and the like, is separated from the oxygen by at least two carbon atoms, for example, by treatment of the resulting compound having the free hydroxyl group with a reactive ester of a lower alkylenediol, in which the two reactive esterified hydroxyl groups are preferably different and are separated from one another by at least two carbon atoms, or with a lower alkyleneoxide or a halogeno-lower alkanol, in which halogeno is separated from hydroxyl by at least two carbon atoms, and converting in a resulting compound having a hydroxy-lower alkoxy substituent the hydroxyl group into a reactive esterified hydroxyl group by esterification; the resulting intermediate is then reacted with an N,N-di-substituted amine to yield the desired compound having an etherified hydroxyl group.

Into the aromatic portion of a resulting compound a substituent may be introduced according to known methods, for example, a nitro group upon nitration with a suitable nitrating reagent. Furthermore, substituents attached to the aromatic portion of a resulting compound may be converted into other substituents. For example, a nitro group may be reduced to an amino group according to known methods, for example, by controlled treatment with hydrogen in the presence of a suitable catalyst, e.g. palladium on charcoal and the like, or converted into an N,N-di-lower alkyl-amino, such as N,N-dimethylamino, group by performing the reduction in the presence of a lower alkanal, such as formaldehyde. An amino group may be converted into a halogeno atom by diazotization, followed by treatment with a cuprous halide according to the Sandmeyer reaction. Or, lower alkoxy, e.g. methoxy and the like, group may be converted into a free hydroxl group by acidic hydrolysis, for example, by treatment with one of the acidic reagents described below.

A salt, such as an acid addition salt, of a resulting compound, may be converted into the free compound according to known methods, for example, by treatment with an alkaline reagent, such as an alkali metal hydroxide or an alkaline earth metal hydroxide, e.g. lithium hydroxide, sodium hydroxide, potassium hydroxide, calcium hydroxide and the like, an alkali metal carbonate or an alkaline earth metal carbonate, e.g. lithium, sodium, potassium or calcium carbonate or hydrogen carbonate and the like, ammonia or any other suitable alkaline reagent, or with a hydroxyl ion exchange preparation and the like.

A resulting salt may be converted into another salt according to known methods. For example, an acid addition salt with an inorganic acid may be treated with the appropriate salt, e.g. sodium, potassium, silver and the like, salt of an acid in the presence of a solvent, in which a resulting inorganic compound is insoluble or sparingly soluble and is thus removed from the reaction medium; a salt may also be converted into another acid addition salt by reacting it with an appropriate anion exchange preparation.

A resulting free base may be converted into its acid addition salts according to known methods, for example, by reacting it, preferably a solution thereof in a solvent or solvent mixture, with an acid or a solution thereof, or with an anion exchange preparation, and isolating the desired salt. Salts may also be obtained in the form of hydrates or may contain solvent of crystallization.

The N-oxide of a resulting compound may be prepared according to known methods, for example, by treatment with a peracid, such as an organic carboxylic peracid, e.g. peracetic, perbenzoic, perphthalic acid and the like, or any other suitable peracid, as well as with hydrogen peroxide and the like, preferably in the presence of an inert solvent.

The compounds of this invention may be converted into their quaternary ammonium derivatives according to known methods, for example, by treatment with a reactive ester of an alcohol and a strong acid. Such reactive esters are, for example, the previously mentioned reagents yielding the lower alkyl or phenyl-lower alkyl quaternary ammonium salts, such as halides, sulfates or sulfonates. The quaternizing reaction is performed in the absence or presence of a solvent, while cooling, at room temperature or at an elevated temperature, under atmospheric or increased pressure, and/or in the atmosphere of an inert gas, e.g. nitrogen.

A resulting quaternary ammonium compound may be converted into another quaternary ammonium compound, such as the corresponding quaternary ammonium hydroxide, which may be obtained, for example, by reacting a quaternary ammonium halide with a silver oxide, a quaternary ammonium sulfate with barium hydroxide, by treating a quaternary ammonium salt with a hydroxyl ion exchange preparation, by electrodialysis or any other appropriate method. From a resulting quaternary ammonium base, there may be prepared a quaternary ammonium salt by treating it with an acid, a mono-lower alkyl sulfate, e.g. methyl sulfate, ethyl sulfate and the like, or any other suitable reagent. A quaternary ammonium compound may also be converted directly into another quaternary ammonium salt without forming a quaternary ammonium hydroxide. For example, a quaternary ammonium iodide may be reacted with freshly prepared silver chloride or with hydrochloric acid in anhydrous methanol; suitable anion exchange preparations may also serve in such conversions. Quaternary ammonium compounds may also be isolated in the form of hydrates thereof or may contain solvent of crystallization.

The starting materials used in the above procedure, which are represented by the compounds of the formula

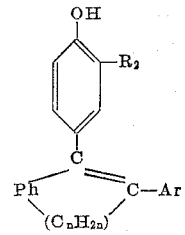

in which $R_2$, Ph, Ar and the group of the formula —$(C_nH_{2n})$— have the previously-given meaning, are prepared according to known methods. For example, a 1-oxo-2-Ar-1,2,3,4-tetrahydro-naphthalene, in which Ar has the previously-given meaning, is reacted with a 4-(functionally converted hydroxy)-phenyl magnesium halide, e.g. chloride, bromide and the like, in which a functionally converted hydroxyl group is primarily an etherified hydroxyl group, such as lower alkoxy, e.g. methoxy, ethoxy and the like, 1-phenyl-lower alkoxy, e.g. benzyloxy and the like, or any other functionally converted hydroxyl group suitable for conversion into a free phenolic hydroxyl group. The above reaction is carried out according to the Grignard reaction; if necessary, the "Method of Entrainment" described by Kharash and Reinmuth, Grignard Reactions of Nonmetallic Substances (Prentice Hall, 1954), or the apparative modification described by Lawesson, Acta Chem. Scand., vol. 12, p. 1 (1958), may be employed. A resulting 1-(4-functionally converted hydroxy-phenyl)-1-hydroxy-2-Ar-1,2,3,4-tetrahydronaphthalene compound may lose the elements of water under the conditions of the reaction, or may be dehydrated subsequently (for example, by treatment with an acid, e.g. hydrochloric acid and the like) to yield the 1-(4-functionally converted hydroxy-phenyl)-2-Ar-3,4-dihydro-naphthalene compound. In the latter, a functionally converted hydroxyl group, such as an etherified hydroxyl group, is converted into the desired free hydroxyl group according to known methods; for example, a lower alkoxy group may be hydrolized into a hydroxyl group by treatment with a suitable acid reagent, such as a mineral acid, e.g. hydrobromic, hydriodic acid and the like (if desired, in the presence of an organic acid, e.g. glacial acetic acid and the like), a mineral acid addition salt of a weak organic base, e.g. pyridine hydrochloride nd the like, or any other suitable reagent, such as, for example, aluminum chloride and the like, whereas a 1-phenyl-lower alkoxy group, especially benzyloxy, is converted into free hydroxyl by hydrogenolysis (for example, by treatment with hydrogen in the presence of a catalyst, e.g. a palladium catalyst and the like, preferably in the presence of a diluent and, if necessary, under pressure).

The intermediates used in the above preparation of the starting material may be obtained according to known methods; for example, the alkali metal salt of a functionally converted Ar-acetic acid, in which Ar has the previously-given meaning, is reacted with a reactive ester of a 2-phenyl-ethanol compound, if necessary, in a resulting functionally converted 4-phenyl-2-Ar-acetic acid compound, the functionally converted carboxyl group is converted into the free carboxyl group or into another functionally converted carboxyl group, and a resulting 4-phenyl-2-Ar-butyric acid or a functional derivative thereof, is treated with a strong Lewis acid ring closing reagent to form the desired intermediate.

The several steps of the above procedure are carried out according to known methods. A functionally converted Ar-acetic acid is primarily an Ar-acetonitrile; its alkali metal salt, such as a sodium or potassium salt is prepared, for example, by treating the Ar-acetonitrile with an alkali metal, e.g. sodium and the like, an alkali metal hydroxide, e.g. sodium hydroxide, potassium hydroxide and the like, an alkali metal hydride, e.g. sodium hydride and the like, an alkali metal amide, e.g. sodium amide, potassium amide and the like, an alkali metal lower alkoxide, e.g. sodium or potassium methoxide, ethoxide, tertiary butoxide and the like, or any other suitable reagent, using an appropriate solvent or solvent mixture as diluents.

The reactive ester of a 2-phenyl-ethanol compound, which is primarily a 2-phenyl-ethyl halide, e.g. chloride, bromide and the like, is prepared, for example, by treating the alcohol compound with a reagent capable of converting a free hydroxyl group into a reactive esterified hydroxyl group, particularly into halogeno, for example, a thionyl halide, e.g. thionyl chloride and the like, a phosphorus halide, e.g. phosphorus tribromide and the like, or any other suitable reagent.

The reaction of the salt of a functionally converted Ar-acetic acid and the reactive ester a 2-phenyl-ethanol compound is carried out according to known methods, preferably in the presence of a solvent, and, if necessary, while cooling or heating, and/or in the atmosphere of an inert gas, e.g. nitrogen.

A functionally converted carboxyl group in the resulting functionally converted 4-phenyl-2-Ar-acetic acid compound is converted into a free carboxyl or another functionally converted carboxyl group; for example, the cyano group in a 4-phenyl-2-Ar-butyronitrile compound may be converted into carbamyl or free carboxyl by treatment with an aqueous solution of an alkali metal hydroxide, e.g. sodium hydroxide and the like, or into esterified carboxyl, such as carbo-lower alkoxy, e.g. carbomethoxy, carbethoxy and the like, by alcoholysis.

The ring closure to form the desired intermediate may be effected by treating the 4-phenyl-2-Ar-butyric acid or a functional derivative thereof with a strong Lewis acid ring closing reagent, such as, polyphosphoric acid, stannic chloride, aluminum chloride, sulfuric acid, hydrochloric acid, boron trifluoride and the like. If necessary, the mixture of the intermediate compound and the ring closing reagent is diluted with an appropriate solvent, the selection of which depends largely on the solubility of the starting material and the nature of the ring closing reagent; preferred solvents are, for example, benzene, toluene, hexane, carbon disulfide, diethyl ether and the like. The reaction is preferably carried out at an elevated temperature, if necessary, in a closed vessel and/or in the atmosphere of an inert gas, e.g. nitrogen.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiment of the invention.

The following examples are intended to illustrate the invention and are not to be construed as being limitations of its scope. Temperatures are given in degrees centigrade.

*Example 1*

A suspension of 3.7 g. of 1-(4-hydroxy-phenyl)-2-phenyl-3,4-dihydro-naphthalene and 3.04 g. of piperidine is stirred and cooled in an ice-bath while adding dropwise 2.6 g. of a 37 percent aqueous solution of formaldehyde over a period of thirty minutes. Stirring is continued for another two hours at room temperature and for one hour while heating on the steam bath. The reaction mixture is then poured into 2 N hydrochloric acid; the aqueous phase is extracted with diethyl ether, and the organic solution is discarded. The acidic solution is made basic with solid sodium hydrogen carbonate, and extracted three times with diethyl ether. The combined ether extracts are washed with water and a saturated solution of sodium chloride in water, dried over sodium sulfate and evaporated to yield an orange-colored oil. The desired 1-[4-hydroxy-3,5-di-(1-piperidino-methyl)-phenyl]-2-phenyl-3,4-di-hydro-naphthalene of the formula

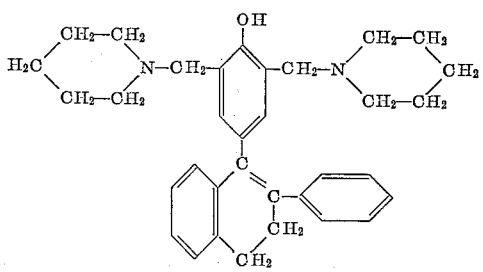

crystallizes under petroleum ether (yield: 2.3 g.) and is recrystallized from ethanol, M.P. 120–122°.

The starting material used in the above procedure is prepared as follows: To a mixture of 2.4 g. of magnesium turnings in 50 ml. of diethyl ether are added a few drops of methyl iodide to initiate the formation of the Grignard reagent and then a solution of 19.0 g. of 4-bromo-anisole in 50 ml. of diethyl ether. The Grignard mixture is refluxed for two hours; while cooling with ice, a solution of 6.7 g. of 2-phenyl-1-oxo-1,2,3,4-tetrahydro-naphthalene in 50 ml. of diethyl ether is added dropwise. After the addition is completed, refluxing is continued for another three hours, and the reaction mixture is allowed to stand for 15 hours and is then cooled with ice. The Grignard complex of 1-hydroxy-1-(4-methoxy-phenyl)-2-phenyl-1,2,3,4-tetrahydro-naphthalene is broken and simultaneously dehydrated by adding 25 ml. of a saturated aqueous solution of ammonium chloride. The resulting mixture is poured into 200 ml. of water; the organic solution is separated, the aqueous layer is extracted twice with diethyl ether, and the organic extracts are combined, washed with water, dried over sodium sulfate and evaporated. The resulting 1-(4-methoxy-phenyl)-2-phenyl-3,4-dihydro-naphthalene melts at 129–130° after recrystallization from a mixture of benzene and n-pentane. A mixture of 40 g. of pyridine and 50 ml. of concentrated hydrochloric acid is slowly heated to 220° while distilling off the water; while maintaining that temperature, 5.0 g. of 1-(4-methoxy-phenyl)-2-phenyl-3,4-dihydro-naphthalene is added, and the reaction mixture is refluxed for thirty minutes. After cooling to room temperature, it is poured into 200 ml. of cold water, the desired 1-(4-hydroxy-phenyl)-2-phenyl-3,4-dihydro-naphthalene precipitates and melts at 124–125° after recrystallization from a mixture of benzene and n-pentane.

*Example 2*

To a suspension of 1.1 g. of 1-[4-hydroxy-3,5-di-(1-piperidino-methyl)-phenyl]-2-phenyl-3,4-dihydro-naphthalene in 5 ml. of water is added 3 ml. of concentrated hydrochloric acid to form a solution, which is then evaporated to dryness under reduced pressure to yield 1.26 g. of the hygroscopic 1-[4-hydroxy-3,5-di-(1-piperidino-methyl)-phenyl]-2-phenyl-3,4-dihydro-naphthalene dihydrochloride.

The 1-[4-hydroxy-3,4-di-(1-piperidino-methyl)-phenyl]-2-phenyl-3,4-dihydro-naphthalene dihydrochloride is dissolved in water, and the volume is brought to 12.6 ml. The pH of the solution is adjusted to about 5 by adding crystalline sodium hydrogen carbonate, and the resulting buffered solution can be used for parenteral administration.

*Example 3*

To 2.6 ml. of the buffered solution of 1-[4-hydroxy-3,5-di-(1-piperidino-methyl)-phenyl]-2-phenyl-3,4-dihydro-1-naphthalene dihydrochloride described in Example 2 is added an additional amount of sodium hydrogen carbonate. The free 1-[4-hydroxy-3,5-di-(1-piperidino-methyl)-phenyl]-2-phenyl-3,4-dihydro-naphthalene precipitates and is extracted twice with 10 ml. portions of di-ethyl ether; the organic solutions are combined, washed with a saturated aqueous solution of sodium chloride, dried over sodium sulfate and evaporated to dryness. The residual oil crystallizes under ethanol which is evaporated to yield 0.18 g. of the free 1-[4-hydroxy-3,5-di-(1-piperidino-methyl)-phenyl]-2-phenyl-3,4-dihydro-naphthalene, M.P. 120–122°.

*Example 4*

A solution of 0.18 g. of 1-[4-hydroxy-3,5-di-(1-piperidino-methyl)-phenyl]-2-phenyl-3,4-dihydro-naphthalene in 3 ml. of ethyl methyl ketone is poured into a warm solution of 0.16 g. of citric acid in 5 ml. of ethyl methyl ketone, whereupon a gummy residue precipitates. The mixture is diluted with 5 ml. of ethanol and warmed to form a clear solution, which is taken to dryness to yield a fluffy amorphous residue. The latter is triturated with 10 ml. of diethyl ether to yield the crystalline hygroscopic 1-[4-hydroxy-3,5-di-(1-piperidino-methyl)-phenyl]-2-phenyl-3,4-dihydro-napthalene dicitrate.

The picrate salt of 1[4-hydroxy-3,5-di-(1-piperidino-methyl)-phenyl]-2-phenyl-3,4-dihydro-naphthalene is obtained by reacting a solution of the 1-[4-hydroxy-3,5-di-(1-piperidino-methyl)-phenyl]-2-phenyl-3,4-dihydro-naphthalene in ethyl methyl ketone with picric acid.

The N-oxide of 1-[4-hydroxy-3,5-di-(1-piperidino-methyl)-phenyl]-2-phenyl-3,4-dihydro-naphthalene and the methiodide of 1-[4-hydroxy-3,5-di-(1-piperidino-methyl)-phenyl]-2-phenyl-3,4-dihydro-naphtahlene are obtained by reacting a solution of 1-[4-hydroxy-3,5-di-(1-piperidino-methyl)-phenyl]-2-phenyl-3,4-dihydro-naphthalene in an appropriate diluent with hydrogen peroxide and methyl iodide, respectively.

*Example 5*

A mixture of 3.7 g. of 1-(4-hydroxy-phenyl)-2-phenyl-3,4-diphenyl-naphthalene and 3.04 g. of diethylamine is treated dropwise with 2.6 g. of a 37 percent aqueous solution of formaldehyde while stirring and cooling in an ice bath. Stirring is continued for two hours at room temperature, and the resulting solution is heated at 100° for two hours and then allowed to stand overnight at room temperature. The reaction mixture is acidified with 2N hydrochloric acid and extracted with diethyl ether. The organic layer is separated and discarded; the aqueous phase is adjusted to pH 7 with sodium hydrogen carbonate and extracted with diethyl ether. The organic solution is swirled with sodium chloride, decanted, dried over sodium sulfate and evaporated. The desired 1-[3,5-di-(N,N-diethylamino-methyl)-4-hydroxyphenyl]-2-phenyl-3,4-dihydro-naphthalene of the formula

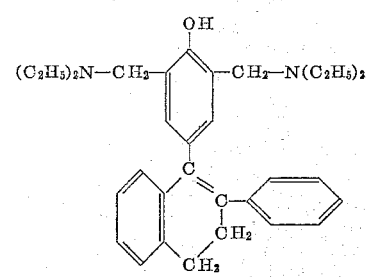

is obtained as a turbid oil, which is dissolved in diethyl ether and treated with a concentrated solution of hydrogen chloride in diethyl ether. The 1-[3,5-di-(N,N-diethyl-amino-methyl)-4-hydroxyphenyl]-2-phenyl-3,4-dihydro-naphthalene dihydrochloride precipitates and melts at 213–214° after recrystallizations from a mixture of acetone and diethyl ether and from a mixture of ethanol and diethyl ether.

*Example 6*

A mixture of 1.7 g. of piperidine and 0.6 g. of para-formaldehyde is dissolved in 10 ml. of 95 percent ethanol by heating to boiling. After cooling, the resulting solution is added to a suspension of 6.0 g. of 1-(4-hydroxy-phenyl)-2-phenyl-3,4-dihydro-naphthalene in 50 ml. of 95 percent ethanol while stirring and cooling in an ice-bath. The reaction mixture is stirred for one hour at room temperature, then refluxed for two hours and evaporated to dryness under reduced pressure. The desired 1-

[4-hydroxy-3-(1-piperidino-methyl)-phenyl]-2-phenyl - 3,4-dihydro-naphthalene of the formula

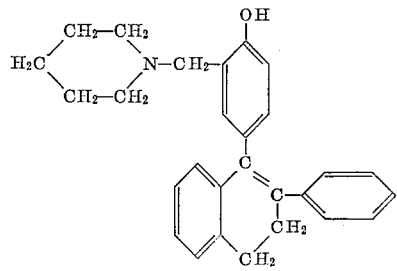

is obtained as an orange oil, which is dissolved in diethyl ether. The solution is treated with a solution of hydrogen chloride in diethyl ether and the resulting precipitate is filtered off; the desired 1-[4-hydroxy-3-(1-piperidino-methyl)-phenyl]-2-phenyl-3,4-dihydro-naphthalene hydrochloride melts at 269–273° after recrystallization from a mixture of ethanol and diethyl ether.

*Example 7*

To a mixture of 2.2 g. of 1-[4-hydroxy-3,5-di-(1-piperidino - methyl) - phenyl] - 2 - phenyl - 3,4 - dihydro-naphthalene in 50 ml. of N,N-dimethylformamide is added in portions 0.214 g. of a 53 percent suspension of sodium hydride in mineral oil while cooling in an ice-bath. Upon cessation of the hydrogen evolution, 2.34 ml. of a toluene solution containing a total of 0.605 g. of 2-N,N-diethyl-aminoethyl chloride, diluted with 50 ml. of toluene, is added. The reaction mixture is stirred for four hours at room temperature and is then allowed to stand overnight. The precipitate is filtered off and washed with diethyl ether; the combined filtrate and washings are evaporated to dryness under reduced pressure, and the residue is diluted with water. The basic material is extracted with 2 N hydrochloric acid; the acidic aqueous extract is adjusted to pH 8 with concentrated ammonium hydroxide and extracted with diethyl ether. The organic extract is swirled with sodium chloride, decanted, dried over sodium sulfate and evaporated to dryness. The desired 1-[4-(2-N,N-diethylaminoethyl)-oxy-3,5-di-(1-piperidino - methyl)-phenyl]-2-phenyl-3,4-dihydro-naphthalene of the formula

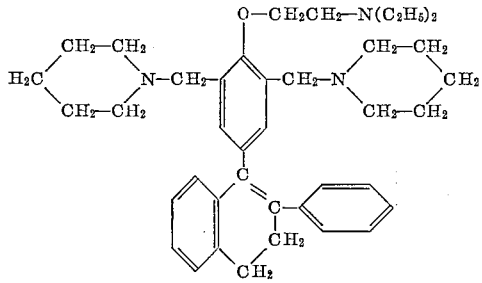

is obtained as an oil and is dissolved in ethyl methyl ketone. To the solution is added a solution of 1.7 g. of citric acid in ethyl methyl ketone to yield the desired 1-[4-(2-N,N-diethylaminoethyl)-oxy-3,5-di-(1 - piperidino-methyl)-phenyl]-2-phenyl-3,4-dihydro - naphthalene tricitrate, M.P. 63–65°.

*Example 8*

To a mixture of 2.2 g. of 1-[4-hydroxy-3-(1-piperidino-methyl)-phenyl]-2-phenyl-3,4-dihydro-naphthalene in 20 ml. of N,N-dimethylformamide is added in portions 0.27 g. of a 53 percent suspension of sodium hydride in mineral oil while stirring. After the cessation of hydrogen, the reaction mixture is cooled and treated with 3.0 ml. of a toluene solution containing a total of 0.75 g. of 2-N,N-diethylaminoethyl chloride, diluted with 20 ml. of toluene, while cooling. The reaction mixture is stirred for three hours at room temperature and is allowed to stand overnight. The solvent is evaporated under reduced pressure; the residue is diluted with water and extracted with diethyl ether. The organic solution is washed with 2 N hydrochloric acid and discarded; the acidic aqueous extracts are adjusted to pH 8 with ammonium hydroxide and extracted with diethyl ether. The combined organic solutions are swirled with sodium chloride, decanted, dried over sodium sulfate and evaporated to dryness. The desired 1-[4-(2-N,N-diethylaminoethyl)-oxy-3-(1 - piperidino - methyl)-phenyl]-2-phenyl-3,4-dihydro-naphthalene of the formula

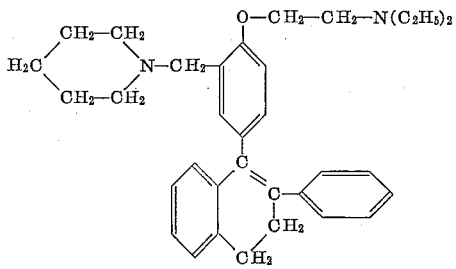

is obtained as an oil, which is dissolved in diethyl ether and treated with a solution of hydrogen chloride in diethyl ether. The slightly hygroscopic 1-[4-(2-N,N-diethylaminoethyl)-oxy-3-(1-piperidino-methyl) - phenyl] - 2-phenyl-3,4-dihydro-naphthalene dihydrochloride is boiled in acetone, filtered off and recrystallized from a mixture of ethanol and diethyl ether, M.P. 255–257°.

*Example 9*

To a mixture of 2.2 g. of 1-[4-hydroxy-3,5-di-(1-piperidino-methyl)-phenyl]-2-phenyl-3,4-dihydro - naphthalene in 50 ml. of N,N-dimethylformamide and 50 ml. of toluene is added 0.693 g. of 2-chloromethyl-2-imidazoline hydrochloride while cooling in an ice bath and stirring. The reaction mixture is then treated with 0.428 g. of a 53 percent suspension of sodium hydride in mineral oil. After stirring at room temperature for four hours and allowing it to stand, the reaction mixture is filtered, the solid material is washed with diethyl ether, and the combined filtrate and washings are evaporated to dryness. The residue is diluted with water and extracted with diethyl ether; the organic extracts are washed with 2 N hydrochloric acid, and the aqueous extracts are adjusted to pH 8 with concentrated ammonium hydroxide. The organic material is extracted with diethyl ether, the ether extracts are swirled with sodium chloride, dried over sodium sulfate and evaporated to dryness. The desired 1-[4-(2-imidazolin-2-yl-methyl)-oxy-3,5-di - (1 - piperidino-methyl)-phenyl]-2-phenyl-3,4-dihydro - naphthalene of the formula

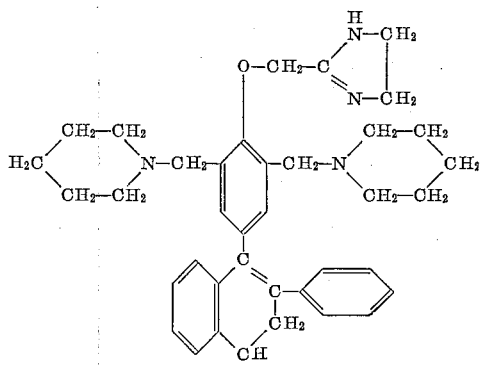

is obtained as an oil, which crystallizes from petroleum ether and is recrystallized from a mixture of ethanol and water, M.P. 162–165°. Its trihydrochloride is obtained by treating a diethyl ether solution of 1-[4-(2-imidazolin - 2 - yl - methyl) - oxy - 3,5 - di - (1 - piperidino - methyl) - phenyl] - 2 - phenyl - 3,4 - dihydro-naphthalene with a solution of hydrogen chloride in diethyl ether.

Example 10

Other 1 - (4 - R - 3 - $R_1$ - 5 - $R_2$ - phenyl) - 2 - Ar-3,4-dihydro-naphthalenes, in which $R_1$, $R_2$ and Ar have the previously-given meaning, and R is hydroxyl, and which are prepared according to the previously-described and illustrated procedure by selecting the appropriate starting materials, are, for example,

| Starting Material | Reagents | Products |
|---|---|---|
| 1-(4-hydroxy-phenyl)-2-phenyl-3,4-dihydronaphthalene. | Pyrrolidine plus formaldehyde | 1-[4-hydroxy-3,5-di-(1-pyrrolidino-methyl)-phenyl]-2-phenyl-3,4-dihydronaphthalene. |
| 2-(4-chloro-phenyl)-1-(4-hydroxy-phenyl)-3,4-dihydro-naphthalene. | Morpholine plus formaldehyde | 2-(4-chloro-phenyl)-1-[4-hydroxy-3,5-di-(4-morpholino-methyl)-phenyl]-3,4-dihydro-naphthalene. |
| 2-(4-chloro-phenyl)-1-(4-hydroxy-phenyl)-3,4-dihydro-naphthalene. | Piperidine plus formaldehyde | 2-(4-chloro-phenyl)-1-[4-hydroxy-3,5-di-(1-piperidino-methyl)-phenyl]-3,4-dihydro-naphthalene. |
| 1-(4-hydroxy-phenyl)-2-(3-methyl-phenyl)-3,4-dihydro-naphthalene. | N,N-dimethylamine plus formaldehyde. | 1-[3-(N,N-dimethylamino-methyl)-4-hydroxy-phenyl]-2-(3-methyl-phenyl)-3,4-dihydro-naphthalene. |
| 1-(4-hydroxy-phenyl)-2-(3-pyridyl)-3,4-dihydro-naphthalene. | N,N-1,6-hexylene-imine plus formaldehyde. | 1-{4-hydroxy-3,5-di-[1-N,N-(1,6-hexylene)-imino-methyl]-phenyl}-2-(3-pyridyl)-3,4-dihydro-naphthalene. |
| 7-chloro-1-(4-hydroxy-phenyl)-2-phenyl-3,4-dihydro-naphthalene. | Piperidine plus formaldehyde | 7-chloro-1-[4-hydroxy-3,5-di-(1-piperidino-methyl)-phenyl]-2-phenyl-3,4-dihydro-naphthalene. |
| 1-(4-hydroxy-phenyl)-2-(4-methoxy-phenyl)-6-methyl-3,4-dihydro-naphthalene. | 4-methyl-piperazine plus formaldehyde. | 1-[4-hydroxy-3,5-di-(4-methyl-1-piperazino-methyl)-phenyl]-2-(4-methoxy-phenyl)-6-methyl-3,4-dihydro-naphthalene. |
| 1-(4-hydroxy-phenyl)-6-methoxy-2-phenyl-3,4-dihydro-naphthalene. | Pyrrolidine plus formaldehyde | 1-[4-hydroxy-3-(1-pyrrolidino-methyl)-phenyl]-6-methoxy-2-phenyl-3,4-dihydro-naphthalene. |
| 6-bromo-1-(4-hydroxy-phenyl)-2-phenyl-3,4-dihydro-naphthalene. | Piperidine plus formaldehyde | 6-bromo-1-[4-hydroxy-3,5-di-(1-piperidino-methyl)-phenyl]-2-phenyl-3,4-dihydro-naphthalene. |
| 2-(3,4-dichloro-phenyl)-1-(4-hydroxy-phenyl)-3,4-dihydro-naphthalene. | N,N-diethylamine plus formaldehyde | 2-(3,4-dichloro-phenyl)-1-[3,5-di-(N,N-diethyl-amino-methyl)-4-hydroxy-phenyl]-3,4-dihydro-naphthalene. |
| 6-fluoro-1-(4-hydroxy-phenyl)-2-phenyl-3,4-dihydro-naphthalene. | Piperidine plus formaldehyde | 6-fluoro-1-[4-hydroxy-3,5-di-(1-piperidino-methyl)-phenyl]-2-phenyl-3,4-dihydro-naphthalene. |
| 1-(4-hydroxy-phenyl)-3-methyl-2-phenyl-3,4-dihydro-naphthalene. | Pyrrolidine plus formaldehyde | 1-[4-hydroxy-3,5-di-(1-pyrrolidino-methyl)-phenyl]-3-methyl-2-phenyl-3,4-dihydro-naphthalene. |
| 1-(4-hydroxy-phenyl)-2-phenyl-7-trifluoro-methyl-3,4-dihydro-naphthalene. | Morpholine plus formaldehyde | 1-[4-hydroxy-3-(4-morpholino-methyl)-phenyl]-2-phenyl-7-trifluoromethyl-3,4-dihydro-naphthalene. |

Example 11

Other 1 - (4 - R - 3 - $R_1$ - 5 - $R_2$ - phenyl) - 2 - Ar-3,4-dihydro-naphthalenes, in which $R_1$, $R_2$ and Ar have the previously-given meaning, and R is an etherified hydroxyl group, and which are prepared according to the previously-described and illustrated procedure, by selecting the appropriate starting materials, are, for example,

| Starting Material | Reagents | Products |
|---|---|---|
| 1-[4-hydroxy-3,5-di-(1-pyrrolidino-methyl)-phenyl]-2-phenyl-3,4-dihydro-naphthalene. | Methyl iodide plus NaH | 1-[4-methoxy-3,5-di-(1-pyrrolidino-methyl)-phenyl]-2-phenyl-3,4-dihydro-naphthalene. |
| 1-[4-hydroxy-3,5-di-(1-piperidino-methyl)-phenyl]-2-phenyl-3,4-dihydro-naphthalene. | 1-(2-chloroethyl)-piperidine plus NaH. | 1-{4-[2-(1-piperidino)-ethyl]-oxy-3,5-di-(1-piperidino-methyl)-phenyl}-2-phenyl-3,4-dihydro-naphthalene. |
| 1-[4-hydroxy-3,5-di-(1-pyrrolidino-methyl)-phenyl]-2-phenyl-3,4-dihydro-naphthalene. | 2-N,N-diethylaminoethyl chloride plus NaH. | 1-[4-(2-N,N-diethylaminoethyl)-oxy-3,5-di-(1-pyrrolidino-methyl)-phenyl]-2-phenyl-3,4-dihydro-naphthalene. |
| 2-(4-chloro-phenyl)-1-[4-hydroxy-3,5-di-(1-piperidino-methyl)-phenyl]-3,4-dihydro-naphthalene. | 2-N,N-diethylaminoethyl chloride plus NaH. | 2-(4-chloro-phenyl)-1-[4-(2-N,N-diethylaminoethyl)-oxy-3,5-di-(1-piperidino-methyl)-phenyl]-3,4-dihydro-naphthalene. |
| 2-(4-chloro-phenyl)-1-[4-hydroxy-3,5-di-(1-piperidino-methyl)-phenyl]-3,4-dihydro-naphthalene. | 1-(2-chloroethyl)-pyrrolidine plus NaH. | 2-(4-chloro-phenyl)-1-{4-[2-(1-pyrrolidino)-ethyl]-oxy-3,5-di-(1-piperidino-methyl)-phenyl}-3,4-dihydro-naphthalene. |
| 1-[3-(N,N-dimethylamino-methyl)-4-hydroxy-phenyl]-2-(3-methyl-phenyl)-3,4-dihydro-naphthalene. | 3-N,N-dimethylaminopropyl chloride plus NaH. | 1-[3-(N,N-dimethylamino-methyl)-4-(3-N,N-dimethyl-aminopropyl)-oxy-phenyl]-2-(3-methyl-phenyl)-3,4-dihydro-naphthalene. |
| 7-chloro-1-[4-hydroxy-3,5-di-(1-piperidino-methyl)-phenyl]-2-phenyl-3,4-dihydro-naphthalene. | 1-(2-chloroethyl)-piperidine plus NaH. | 7-chloro-2-phenyl-1-{4-[2-(1-piperidino)-ethyl]-oxy-3,5-di-(1-piperidino-methyl)-phenyl}-3,4-dihydro-naphthalene. |
| 1-[4-hydroxy-3-(1-pyrrolidino-methyl)-phenyl]-6-methoxy-2-phenyl-3,4-dihydro-naphthalene. | 1-(2-chloroethyl)-pyrrolidine plus NaH. | 6-methoxy-2-phenyl-1-{4-[2-(1-pyrrolidino)-ethyl]-oxy-3-(1-pyrrolidino-methyl)-phenyl}-3,4-dihydro-naphthalene. |
| 2-(3,4-dichloro-phenyl)-1-[3,5-di-(N,N-diethyl-amino-methyl)-4-hydroxy-phenyl]-3,4-dihydro-naphthalene. | 2-N,N-diethylaminoethyl chloride plus NaH. | 2-(3,4-dichloro-phenyl)-1-[4-(2-N,N-diethylamino-ethyl)-oxy-3,5-di-(N,N-diethylamino-methyl)-phenyl]-3,4-dihydro-naphthalene. |
| 1-[4-hydroxy-3,5-di-(1-piperidino-methyl)-phenyl]-2-phenyl-3,4-dihydro-naphthalene. | 1-(2-chloroethyl)-pyrrolidine plus NaH. | 1-{3,5-di-(1-piperidino-methyl)-4-[2-(1-pyrrolidino)-ethyl]-oxy-phenyl}-2-phenyl-3,4-dihydro-naphthalene. |
| 1-[3,5-di-(N,N-diethylamino-methyl)-4-hydroxy-phenyl]-2-phenyl-3,4-dihydro-naphthalene. | 2-chloromethyl-2-imidazoline hydrochloride plus NaH. | 1-[3,5-di-(N,N-diethylamino-methyl)-4-(2-imidazolin-2-yl-methyl)-oxyphenyl]-2-phenyl-3,4-dihydro-naphthalene. |
| 1-[4-hydroxy-3-(1-piperidino-methyl)-phenyl]-2-phenyl-3,4-dihydro-naphthalene. | 2-chloromethyl-1-methyl-2-imidazoline hydrochloride plus NaH. | 1-[4-(1-methyl-2-imidazolin-2-yl-methyl)-oxy-3-(1-piperidino-methyl)-phenyl]-2-phenyl-3,4-dihydro-naphthalene. |
| 2-(4-chloro-phenyl)-1-[4-hydroxy-3,5-di-(1-piperidino-methyl)-phenyl]-3,4-dihydro-naphthalene. | 2-chloromethyl-2-imidazoline hydrochloride plus NaH. | 2-(4-chloro-phenyl)-1-[4-(2-imidazolin-2-yl-methyl)-oxy-3,5-di-(1-piperidino-methyl)-phenyl]-3,4-dihydro-naphthalene. |
| 1-[3,5-di-(N,N-diethylamino-methyl)-4-hydroxy-phenyl]-2-phenyl-3,4-dihydro-naphthalene. | 2-chloromethyl-1,4,5,6-tetrahydro-pyrimidine plus NaH. | 1-[3,5-di-(N,N-diethylamino-methyl)-4-(1,4,5,6-tetrahydro-pyrimidin-2-yl-methyl)-oxy-phenyl]-2-phenyl-3,4-dihydro-naphthalene. |

I claim:
1. A member selected from the group consisting of a compound of the formula

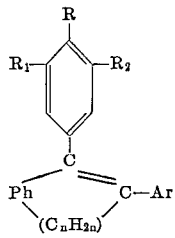

in which R is a member selected from the group consisting of hydroxyl, lower alkoxy, N,N-di-lower alkyl-amino-lower alkoxy, N,N-alkyleneimino-lower alkoxy in which alkylene has 4 to 8 carbon atoms, N,N-aza-alkyleneimino-lower alkoxy and N-lower alkyl-N,N-aza-alkyleneimino-lower alkoxy in which alkylene has 4 to 6 carbon atoms, morpholino-lower alkoxy, thiamorpholino-lower alkoxy in all of which radicals containing more than one heteroatom, two heteroatoms are separated by 2 to 3 carbon atoms, (1,3-diaza-2-cycloalken-2-yl)-methoxy and N-lower alkyl-(1,3-diaza-2-cycloalken-2-yl)-methoxy in which the 1,3-diaza-2-cycloalken-2-yl portion has from 5 to 6 ring members, $R_1$ is a member selected from the group consisting of N,N-di-lower alkylaminomethyl, N-cycloalkyl-N-lower alkylaminomethyl in which cycloalkyl has 5 to 7 ring carbon atoms, N-lower alkyl-N-phenyl-lower alkylaminomethyl, N-hydroxy-lower alkyl-N-lower alkylaminomethyl, N,N-di-hydroxy-lower alkyl-aminomethyl N,N-alkyleneiminomethyl in which alkylene has 4 to 8 carbon atoms, N,N-aza-alkyleneiminomethyl and N-lower alkyl-N,N - aza - alkyleneiminomethyl in which alkylene has 4 to 6 carbon atoms and the nitrogen atoms are separated by at least 2 carbon atoms, morpholinomethyl and thiamorpholinomethyl, $R_2$ is a member selected from the group consisting of hydrogen and a radical listed for $R_1$, Ph is a member selected from the group consisting of 1,2-phenylene, (lower alkyl)-1,2-phenylene, (lower alkoxy)-1,2-phenylene and (halogeno)-1,2-phenylene, Ar is a member selected from the group consisting of phenyl, (lower alkyl)-phenyl, (lower alkoxy)-phenyl and (halogeno)-phenyl and the group —$(C_nH_{2n})$— is lower alkylene separating Ph from the carbon atom carrying Ar by 2 carbon atoms, an N-oxide thereof, a lower alkyl-quaternary thereof and an acid addition salt of these compounds.

2. A member selected from the group consisting of the compound having the formula

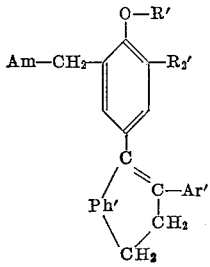

in which Ph is a member selected from the group consisting of 1,2-phenylene, (lower alkyl)-1,2-phenylene, (lower alkoxy) - 1,2 - phenylene, and (halogeno)-1,2-phenylene, Ar' is a member selected from the group consisting of phenyl, (lower alkyl)-phenyl, (lower alkoxy)- phenyl and (halogeno)-phenyl, R' is a member selected from the group consisting of hydrogen, N,N-di-lower alkyl-amino-lower alkoxy, in which the nitrogen is separated from the oxygen by two to three carbon atoms, N,N-alkylene-imino-lower alkoxy, in which alkylene has from four to eight carbon atoms, and the nitrogen is separated from the oxygen by two to three carbon atoms, and (1,2-diaza-2-cycloalken-2-yl)-methoxy, in which the 1,2-diaza-2-cycloalken-2-yl portion has from five to six ring members, Am is a member selected from the group consisting of N,N-di-lower alkyl-amino and N,N-alkylene-imino, in which alkylene has from four to eight carbon atoms, and $R_2'$ is a member selected from the group consisting of hydrogen and the group Am—$CH_2$— in which Am has the previously-given meaning, and an acid addition salt thereof.

3. A member selected from the group consisting of the compound having the formula

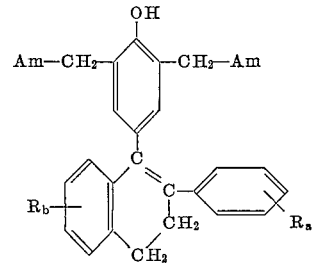

in which Am is a member selected from the group consisting of N,N-di-lower alkyl-amino, N,N-alkylene-imino, in which alkylene has from four to six carbon atoms, 4-lower alkyl-piperazino and 4-morpholino, and each of the groups $R_a$ and $R_b$ is a member selected from the group consisting of hydrogen, lower alkyl, lower alkoxy and halogeno, and an acid addition salt thereof.

4. A member selected from the group consisting of 1-[4-hydroxy - 3,5 - di-(1-piperidino-methyl)-phenyl]-2-phenyl-3,4-dihydro-naphthalene, and an acid addition salt thereof.

5. A member selected from the group consisting of 1-[3,5-di-(N,N-diethylamino - methyl)-4-hydroxy-phenyl] 2-phenyl-3,4-dihydro-naphthalene, and an acid addition salt thereof.

6. A member selected from the group consisting of 1-[4-hydroxy-3-(1-piperidino-methyl) - phenyl]-2-phenyl-3,4-dihydro-naphthalene, and an acid addition salt thereof.

7. A member selected from the group consisting of 1-[4 - (2 - N,N - diethylaminoethyl)oxy-3-(1-piperidinomethyl)-phenyl]-2-phenyl-3,4-dihydro - naphthalene, and an acid addition salt thereof.

8. A member selected from the group consisting of 1-[4-(2-N,N-diethylaminoethyl) - oxy - 3,5-di-(1-piperidino-methyl)-phenyl]-2-phenyl-3,4-dihydro - naphthalene, and an acid addition salt thereof.

9. A member selected from the group consisting of 1-[4 - (2 - imidazolin-2-yl-methyl)-oxy-3,5-di-(1-piperidino-methyl)-phenyl]-2-phenyl-3,4-dihydro - naphthalene, and an acid addition salt thereof.

References Cited by the Examiner
UNITED STATES PATENTS 2,855,399  10/1958  Schmidt et al. _____ 260—294.7

JOHN D. RANDOLPH, *Primary Examiner.*

AVROM D. SPEVACK, *Assistant Examiner.*